UNITED STATES PATENT OFFICE.

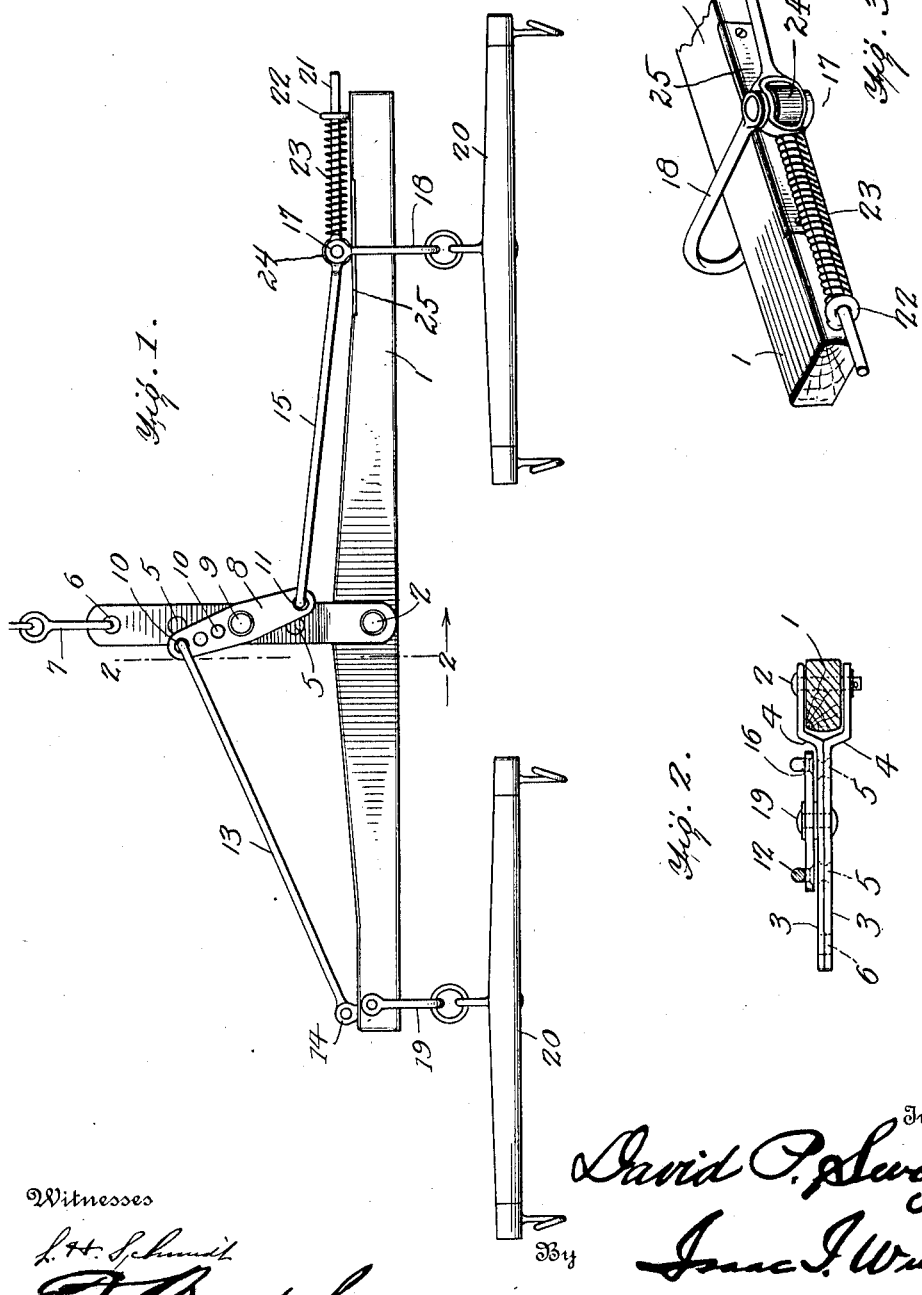

DAVID P. SWEGER, OF CHAMBERSBURG, PENNSYLVANIA.

DRAFT-EQUALIZER.

1,020,934. Specification of Letters Patent. Patented Mar. 19, 1912.

Application filed July 8, 1911. Serial No. 637,547.

*To all whom it may concern:*

Be it known that I, DAVID P. SWEGER, a citizen of the United States, residing at Chambersburg, in the county of Franklin and State of Pennsylvania, have invented new and useful Improvements in Draft-Equalizers, of which the following is a specification.

This invention relates to double-trees, and has particular reference to a novel form of draft-equalizer for automatically distributing the draft between horses drawing the load, according to their respective strengths and pulling powers.

The objects of the invention are, *inter alia:* 1. To provide a draft-equalizer which shall be simple in construction, durable in service, and entirely practical and thoroughly efficient in operation and use. 2. To provide a draft-equalizer which is susceptible of manufacture and sale at a low figure. 3. To provide a draft-equalizer which is entirely automatic in its operation, and which operates, when used with two horses of unequal strength and power, to give increasingly longer leverage to the weaker horse, proportioned to the strength of the stronger animal and the varyingly greater pull which he exerts on the load.

With these objects in view, and others appearing as the specification proceeds and the nature of the invention more fully appears, the invention consists of the novel construction, combination and arrangement of a draft-equalizer, as hereinafter more fully explained in the specification, summed up in the claims, and illustrated in the drawing.

In the accompanying drawing, I have shown an embodiment of my invention capable of carrying out the underlying principle thereof, it being understood that modifications may be resorted to within the scope of the appended claims, without departing from the spirit of the invention.

In said drawing: Figure I is a top plan view of the invention; Fig. II is a section on the line 2—2, Fig. I, looking in the direction of the arrow; Fig. III is a fragmentary perspective view, taken from a position at, and looking toward, the right-hand end of the device shown in Fig. I.

Referring, now, in detail to the drawing: 1 designates a double-tree. A bracket, pivoted at one end thereof (on a pivot-pin 2) to said double-tree 1, extends normally at right-angles thereto, between the ends thereof; and said bracket may be formed of complementary, superposed bars 3, 3, having their ends bent at 4, 4, to form a yoke 5 embracing the double-tree 1, and through which said pivot-pin 2 extends. The two members or parts 3, 3 of the bracket may be held assembled in any suitable or preferred manner, as by rivets 5, 5. The other end of said bracket is provided with an aperture 6 therethrough, whereby said double-tree 1 may be operatively associated with the load to be drawn, as by a hook 7 engaging said aperture 6. Carried by said bracket is a rocking-member 8, which preferably comprises a bar pivoted medially of its length, as at 9, to said bracket, and provided toward one end with a series of apertures 10, 10, 10, and toward the other end with a single aperture 11. Pivotally engaging one of said apertures 10, 10, 10 (in this instance, the upper one, as shown in the drawing) is the bent end 12 of a link or rod 13, the other end of said link being pivotally secured in a screw-eye 14 or the like carried at one end of the double-tree 1. A similar link or rod 15 has a bent end 16 engaging in the opening 11. The other end of the rod 15 terminates in a cage 17 to which is pivotally secured the end of a clevis 18 encircling and slidably-reciprocable on the double-tree 1. A non-slidable clevis 19 is carried by the other end of the double-tree 1. The clevises 18, 19 connect with the usual whiffletrees 20, 20. Inside of cage 17 is pivoted an anti-friction roller 24, running on a track 25, of any desired length, carried by the double-tree whereby friction and wear are reduced to a minimum. A rod 21 extending, at one end, from the aforesaid cage 17, may be secured to the latter in any suitable manner, or (as shown in the drawing) may be formed integral therewith, and thus form an extension of rod 15. Said rod 21 projects through a screw-eye 22 carried at the end of the double-tree 1. Encircling that portion of the rod 21 between the pivotal end 17 and the eye 22 is a coiled spring 23, bearing, at one end, against the said cage 17 and, at its other end, against said eye 22.

In operation, the stronger horse is secured to the whiffle-tree connected to the clevis 19. Now, it will be apparent that, in pulling the load, before the stronger horse can swing the double-tree 1 on its pivot 2, he will have to exert such a pull as will overcome the power of the spring 23 and compress the same. When the stronger horse does, in pulling, overcome the power of said spring 23 and swings the double-tree 1 on its pivot 2, the link 13 will pull upon the upper end of the rocker 8, rocking the same on its pivot 9, causing a reverse movement of the lower end of said rocker 8 and forcing the link 15 outward, thereby sliding the traveling clevis 19 along the double-tree 1 toward the end thereof, thus giving the weaker horse a longer leverage, as is apparent.

Both the links 13, 15, may be removably connected with the rocker 8. The purpose or function of the series of holes 10, 10, 10 in the upper end of the rocker 8 is this: By inserting the end of the link 13 in the opening 10 next from the top, a shorter leverage of the link 13 on the rocker 8 will be secured, thus, for the same degree of pivotal movement of the double-tree 1, effecting a smaller throw of the rocker 8 than if the link 13 were secured in the upper hole 10 of said series. A still shorter throw will be effected by engaging the link 13 in the lowermost opening 10 of said series. The adjustability feature of the links is, therefore, important.

Having thus fully described my invention, what I claim as new and desire to secure by Letters-Patent is:

1. A draft-equalizer, comprising a double-tree, a bracket pivotally secured thereto at a point between the ends thereof, a rocker pivotally carried by said bracket, a link pivoted, at one end, to one end of said rocker and, at the other end, to one end of said double-tree, a second link pivoted, at one end, to the other end of said rocker, a traveling clevis secured to the other end of said second link and slidable on said double-tree, a projection carried by that end of the double-tree nearest to said traveling clevis, and a coiled spring interposed between the end of said second link and said projection.

2. A draft-equalizer, comprising a double-tree, a bracket pivotally secured thereto at a point between the ends thereof, a rocker pivotally carried by said bracket, a link pivoted, at one end, to one end of said rocker and, at the other end, to one end of said double-tree, a second link pivoted, at one end, to the other end of said rocker, a traveling clevis secured to the other end of said second link and slidable on said double-tree, a projection carried by that end of the double-tree nearest to said traveling clevis, said second link carrying a lateral extension projecting through said projection, and a coiled spring encircling said extension and interposed between the end of said second link and said projection.

In testimony whereof I have hereunto set my hand in presence of two subscribing witnesses.

DAVID P. SWEGER.

Witnesses:
SARAH T. FROMMEYER,
ALFRED T. GAGE.

---

Copies of this patent may be obtained for five cents each, by addressing the "Commissioner of Patents, Washington, D. C."